(12) United States Patent
Connor

(10) Patent No.: US 9,778,388 B1
(45) Date of Patent: Oct. 3, 2017

(54) SYSTEMS AND METHODS FOR AUTONOMOUS TOWING OF AN UNDERWATER SENSOR ARRAY

(71) Applicant: THAYERMAHAN, INC., Mystic, CT (US)

(72) Inventor: Michael Joseph Connor, Mystic, CT (US)

(73) Assignee: THAYERMAHAN, INC., Mystic, CT (US)

( * ) Notice: Subject to any disclaimer, the term of this patent is extended or adjusted under 35 U.S.C. 154(b) by 0 days.

(21) Appl. No.: 15/388,212

(22) Filed: Dec. 22, 2016

(51) Int. Cl.
*G01V 1/38* (2006.01)

(52) U.S. Cl.
CPC .................. *G01V 1/3817* (2013.01)

(58) Field of Classification Search
CPC ...... G08C 23/02; G01C 21/20; G01V 1/3808; G01V 1/3826; G01V 3/083; G01V 1/3835; F16L 1/24; G01H 9/00; G01H 3/005; B63B 21/66; H01M 4/90; D07B 5/00; G06F 21/33; B63B 11/42; B64C 39/024; B63G 8/42; G01S 5/0027; G01S 5/18; F02M 37/0052

See application file for complete search history.

(56) References Cited

U.S. PATENT DOCUMENTS

| | | | | |
|---|---|---|---|---|
| 3,987,745 A | * | 10/1976 | Chaverebiere de Sal | B63B 21/66 114/245 |
| 4,486,861 A | * | 12/1984 | Harmel | G08C 23/02 367/106 |
| 4,912,682 A | * | 3/1990 | Norton, Jr. | G01V 1/3835 367/19 |
| 6,140,958 A | * | 10/2000 | Johnson | G01S 5/0027 342/357.31 |
| 6,208,584 B1 | * | 3/2001 | Skinner | G01H 3/005 367/13 |
| 6,590,831 B1 | * | 7/2003 | Bennett | B63B 21/66 367/16 |
| 6,913,854 B1 | * | 7/2005 | Alberte | H01M 4/90 429/119 |
| 7,359,604 B2 | | 4/2008 | Po | |
| 7,371,136 B2 | | 5/2008 | Hine et al. | |
| 7,386,210 B2 | | 6/2008 | Farroni et al. | |

(Continued)

FOREIGN PATENT DOCUMENTS

| | | | | |
|---|---|---|---|---|
| IT | WO 9950619 A1 | * | 10/1999 | G01C 21/20 |
| IT | WO 9950619 A1 | * | 10/1999 | G01C 21/20 |

(Continued)

OTHER PUBLICATIONS

Co-pending U.S. Appl. No. 15/387,554, filed Dec. 21, 2016.
U.S. Appl. No. 15/387,554 Office Action dated Jun. 7, 2017.

*Primary Examiner* — Yuri Kan
(74) *Attorney, Agent, or Firm* — Wilson Sonsini Goodrich & Rosati

(57) ABSTRACT

The methods and devices described herein provide a sensor array positioning system that may allow a user to program a series of sensor array locations, depths and orientations into a control center, which therein commands an unmanned surface or submarine vehicle which positions a sensor array. The devices comprise of an unmanned vehicle using less than about 20 Watts of power, a tow cables, a flexible sensor array comprising one or more sensors, one or more floats and one or more weights.

26 Claims, 3 Drawing Sheets

(56) References Cited

U.S. PATENT DOCUMENTS

| | | | |
|---|---|---|---|
| 7,775,174 B1* | 8/2010 | Humphreys | B63B 21/66 114/244 |
| 8,611,002 B2 | 12/2013 | Frith | |
| 8,668,534 B2 | 3/2014 | Hine et al. | |
| 8,764,498 B2 | 7/2014 | Hine | |
| 8,808,041 B2 | 8/2014 | Hine et al. | |
| 9,151,267 B2 | 10/2015 | Hine et al. | |
| 9,352,996 B2 | 5/2016 | Guertin et al. | |
| 2003/0208320 A1* | 11/2003 | Zajac | G01V 1/3826 702/14 |
| 2009/0020063 A1* | 1/2009 | Ruffa | B63C 11/42 114/253 |
| 2009/0224099 A1* | 9/2009 | Steele | B64C 39/024 244/1 TD |
| 2011/0055557 A1* | 3/2011 | Nakamura | G06F 21/33 713/156 |
| 2012/0042855 A1* | 2/2012 | Vogely | F02M 37/0052 123/498 |
| 2012/0134671 A1* | 5/2012 | Edwards | G01V 3/083 398/43 |
| 2012/0186507 A1* | 7/2012 | Nock | B63G 8/42 114/280 |
| 2012/0227504 A1* | 9/2012 | Goldner | G01H 9/00 73/655 |
| 2013/0247536 A1* | 9/2013 | Erlendsson | D07B 5/00 57/309 |
| 2013/0266380 A1* | 10/2013 | Capron | F16L 1/24 405/184.4 |
| 2014/0153363 A1 | 6/2014 | Juhasz et al. | |
| 2014/0284998 A1 | 9/2014 | Brennan et al. | |
| 2014/0355380 A1 | 12/2014 | Barral et al. | |
| 2015/0323692 A1 | 11/2015 | Reynolds | |
| 2015/0346365 A1* | 12/2015 | Desrues | G01V 1/3808 367/20 |
| 2016/0023739 A1 | 1/2016 | Brennan et al. | |
| 2016/0139245 A1* | 5/2016 | Forero | G01S 5/18 367/127 |

FOREIGN PATENT DOCUMENTS

| | | |
|---|---|---|
| WO | WO-2008116205 A1 | 9/2008 |
| WO | WO-2012126009 A2 | 9/2012 |
| WO | WO-2013003640 A1 | 1/2013 |
| WO | WO-2014145601 A2 | 9/2014 |

* cited by examiner

SYSTEMS AND METHODS FOR AUTONOMOUS TOWING OF AN UNDERWATER SENSOR ARRAY

BACKGROUND OF THE INVENTION

The information disclosed and claimed below relates generally to the field of ocean monitoring with acoustic, electromagnetic, pressure, or optical sensors. More specifically, it provides a sensor array positioning system that can function without a pilot for long periods of time at sea.

INCORPORATION BY REFERENCE

All publications, patents, and patent applications mentioned in this specification are herein incorporated by reference to the same extent as if each individual publication, patent, or patent application was specifically and individually indicated to be incorporated by reference.

SUMMARY OF THE INVENTION

Provided herein are methods, devices and systems for positioning a subsea sensor array. An aspect of the invention provides a system, the system comprising: control station, an autonomous vehicle, a tow cable, a float, a weight and a tow body.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications may be made within the scope of the invention without departing from the spirit thereof.

In one aspect disclosed herein is a sensor array positioning system comprising a control station, an unmanned watercraft using less than about 20 Watts of power and comprising a thrudder, a tow cable, having a distal end and a proximal end, attached to the autonomous watercraft, whose thickness is less than about 3 mm, a float attached to the tow cable, a weight attached to the tow cable, a tow body attached to the tow cable, and a sensor array having a distal end and a proximal end, that is attached to the tow body, wherein the system configured to tow the sensor array at a depth of more than about 50 m and at a speed of less than about 5 knots.

In some embodiments, the tow cable's proximal end is attached to the sub body, and the tow cable's distal end is attached to the sensor array's proximal end. In some embodiments, the tow body is attached to the sensor array. In some embodiments, the tow body is attached to the tow cable and the sensor array.

In some embodiments, the control station comprises a computer system comprising a processor, a memory and an operating system. In some embodiments, the computer system is a cloud computer system.

In some embodiments, the watercraft comprises a ship, boat, an aerial drone, a hovercraft, a submarine or any combination thereof.

In some embodiments, the watercraft contains a digital signal processor. In some embodiments, the digital signal processor comprises a microprocessor, a microcontroller, a central processing unit, or any combination thereof. In some embodiments, the digital signal processor contains a system for tampering prevention. In some embodiments, the system for tampering prevention comprises encryption, cryptography, or any combination thereof.

In some embodiments, the sensor array comprises an acoustic sensor or a non-acoustic sensor comprising a depth sensor or an electromagnetic sensor. In some embodiments, the depth sensor comprises a bathymeter, an echosounder, an ultrasound meter, an ultrasound meter, or a laser distance meter.

In some embodiments, the sensors are equally spaced along the length of the sensor array. In some embodiments, the tow cable further comprises a float, or a weight or any combination thereof.

Some embodiments further comprise a tow cable direction sensor mounted to the watercraft.

In a second aspect disclosed herein is a method for positioning one or more submerged sensor arrays comprising a user programing a target parameter into a control station, the control station calculating an autonomous sensor array positioning system operational instruction, the control station sending an operational instructions to the autonomous sensor array positioning system, the autonomous sensor array positioning system receiving an operational instruction, the autonomous sensor array positioning system storing an operational instruction, the autonomous sensor array positioning system measuring its current position and the autonomous sensor array positioning system modifying its position.

In some embodiments, a target parameter comprises the sensor's position, the sensor's velocity, the sensor's heading, initiating sensor measurement or ceasing sensor measurement.

In some embodiments, an operational instruction comprises the autonomous watercraft's position, the autonomous watercraft's velocity, the autonomous watercraft's heading or the sensor's depth.

In some embodiments, a series of one or more target parameters can be programed automatically by selecting a mode. In some embodiments, the target parameters programed by selecting a mode are time independent. In some embodiments, the target parameters programed by selecting a mode are time dependent. In some embodiments, the modes comprise patterns of target parameters for transit, obstacle avoidance, debris disentanglement, trip wire, and searching. In some embodiments, the sensor transit mode comprises setting the sensor's velocity to a maximum value, ceasing sensor measurement or any combination thereof. In some embodiments, the obstacle avoidance mode comprises setting the sensor's velocity to a minimum value, setting the sensor's velocity to a maximum value, ceasing sensor measurement or any combination thereof. In some embodiments, the debris disentanglement mode comprises setting the sensor's velocity to a minimum value, setting the sensor's velocity to a maximum value, setting the sensor's heading to one or more set values, ceasing sensor measurement or any combination thereof. In some embodiments, the trip wire mode comprises setting the sensor's position to a set value, setting the sensor's velocity to a set value, setting the sensor's heading to a set value, initiating sensor measurement or any combination thereof. In some embodiments, the search mode comprises setting the sensor's position to a set value, setting the sensor's velocity to a set value, setting the sensor's heading to a set value, initiating sensor measurement or any combination thereof.

Some embodiments further comprise setting a time period value associated with each set target parameter value.

In some embodiments, step of the autonomous sensor array positioning system measuring its current position comprises measuring the location of a watercraft, measuring the heading of a watercraft, measuring the sensor's depth or any combination thereof.

In some embodiments, the location of the autonomous watercraft is measured by a GPS receiver. In some embodiments, the heading is measured by a compass. Some embodiments further comprise reading a tow cable direction sensor measurement. Some embodiments further comprise the autonomous underwater measurement system communicating the current position to the control station.

In some embodiments, the step of the autonomous sensor array positioning system modifying its position comprises modifying the position of the autonomous watercraft, modifying the velocity of the autonomous watercraft, modifying the heading of the autonomous watercraft or any combination thereof.

In some embodiments, the step of the autonomous sensor array positioning system modifying its position is not implemented if the location measurement reading in the step of the autonomous sensor array positioning system measuring its current position is within a set accuracy of the respective autonomous watercraft's stored target position.

Some embodiments further comprise the autonomous sensor positioning system overriding a stored target positions with the stored location measurement if the location measurement reading is within a set accuracy of the autonomous watercraft's stored target position.

Some embodiments comprise a step of the sensor positioning system remeasuring its current position after a period of time.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Figure 1:
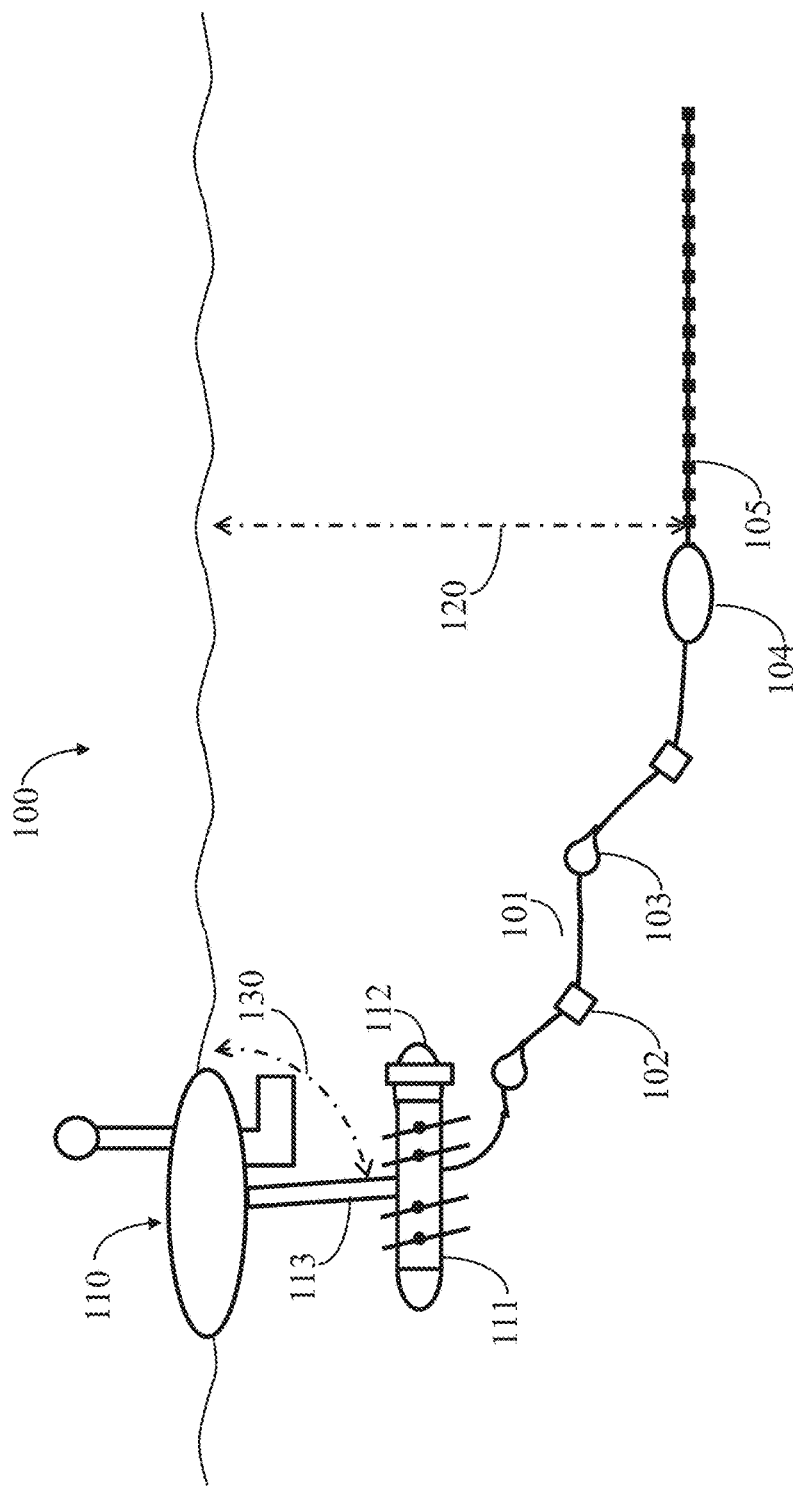
FIG. 1 shows an exemplary side view schematic diagram of a sensor array positioning system.

Referring to FIG. 1, in a particular embodiment, the sensor array positioning system 100 comprises a control station, an autonomous vehicle 110, a tow cable 101, a tow body 104, a sensor array 105, a weight 102, a float 103, a sub body 111, a thrudder 112, and a tow arm 113. As seen, the proximal end of the sensor array 105 is connected to the distal end of the tow cable 101 and the tow body 104, wherein the tow cable 101 comprises a weight 102, and a float 103. Additionally, the proximal end of the tow cable 101 is connected to the sub body 111, wherein the sub body 111 comprises a thrudder 112, and wherein the sub body 111 is rotatably connected to the autonomous vehicle 110 by a tow arm 113. As such, per this embodiment of the sensor array positioning system 100, the autonomous vehicle 110, pulls the tow arm 113, at a tow incidence angle 130, which thus translates the sensor array 105, at a set depth 120, due to the balance between the components' weight and drag in the water.

Figure 2:
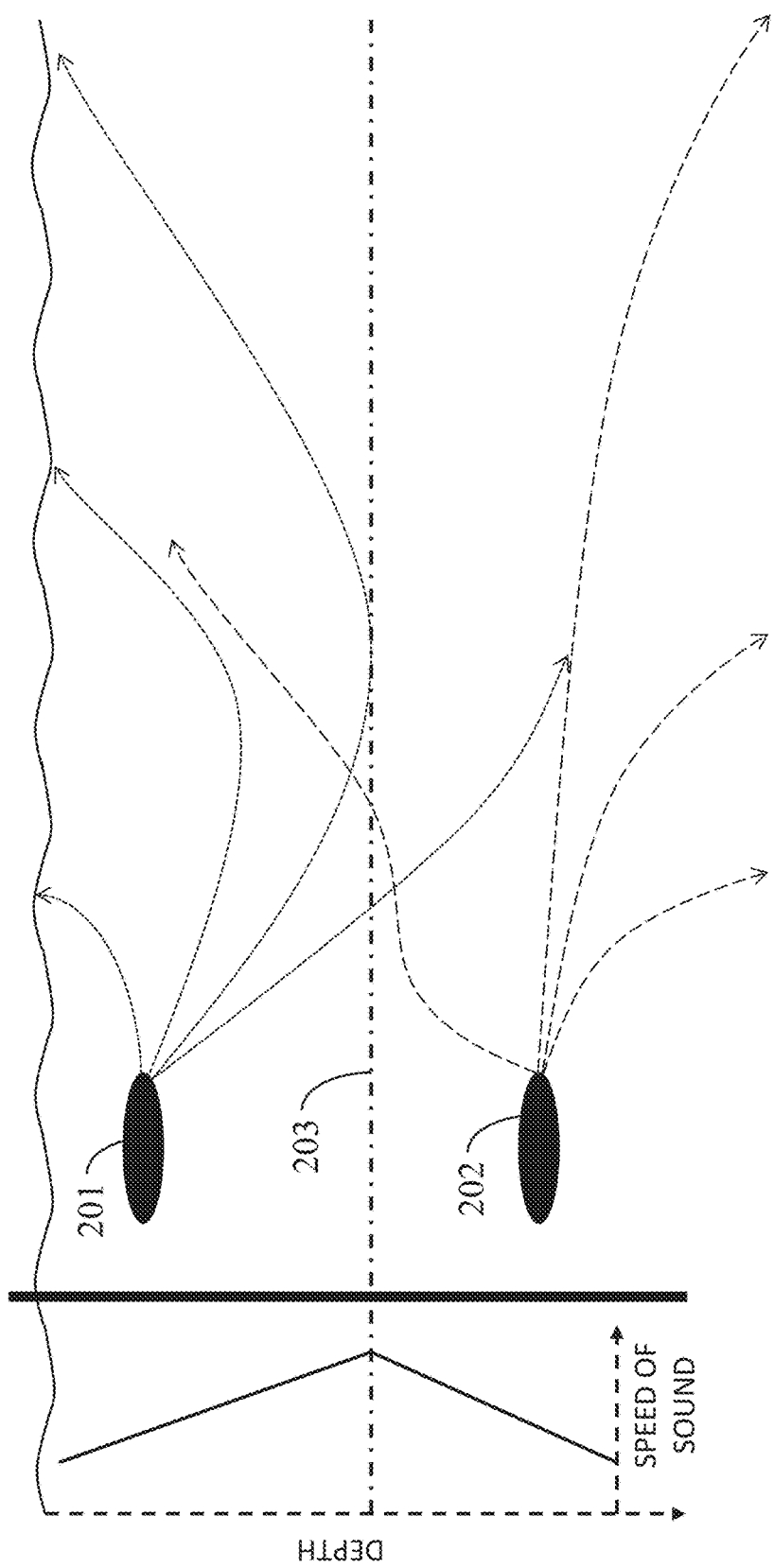
FIG. 2 shows an exemplary schematic side view diagram illustrating the relationship between the speed of sound and the shape of refracted sound propagation rays and ocean depth.

FIG. 2 is an exemplary illustration of the effect of the depth on the speed of sound in seawater. The cumulative effect of temperature, water pressure and salinity within the ocean may combine to form regions of minimum sound speed in a water column. Pressure in the ocean may increase linearly with depth, although temperature generally falls rapidly in the main thermocline from the surface to around a thousand meters deep, then remains almost unchanged from there to the ocean floor in the deep sea. Near the surface, the rapidly falling temperature may cause a decrease in sound speed, or a negative sound speed gradient. With increasing depth, the increasing pressure may cause an increase in sound speed, or a positive sound speed gradient. The depth where the sound speed is at a minimum is called the sonic layer depth (SLD) 203 or the sound channel axis. Through refraction, sound refract towards the area of slowest speed as it propagates. As such, this phenomenon may cause sound waves to bend away from the SLD 203.

As seen, a sound wave emitted from a source 201 above the SLD 203 may refract upwards towards the ocean surface, unless emitted at an angle negative to horizontal and/or at an intensity sufficient to overcome the upwards force of refraction. Likewise, per FIG. 2, a sound wave emitted from a source 202 below the SLD 203 naturally refract downwards to the ocean floor, unless emitted at an angle positive to horizontal and/or at an intensity sufficient to overcome the downwards force of refraction.

Figure 3:
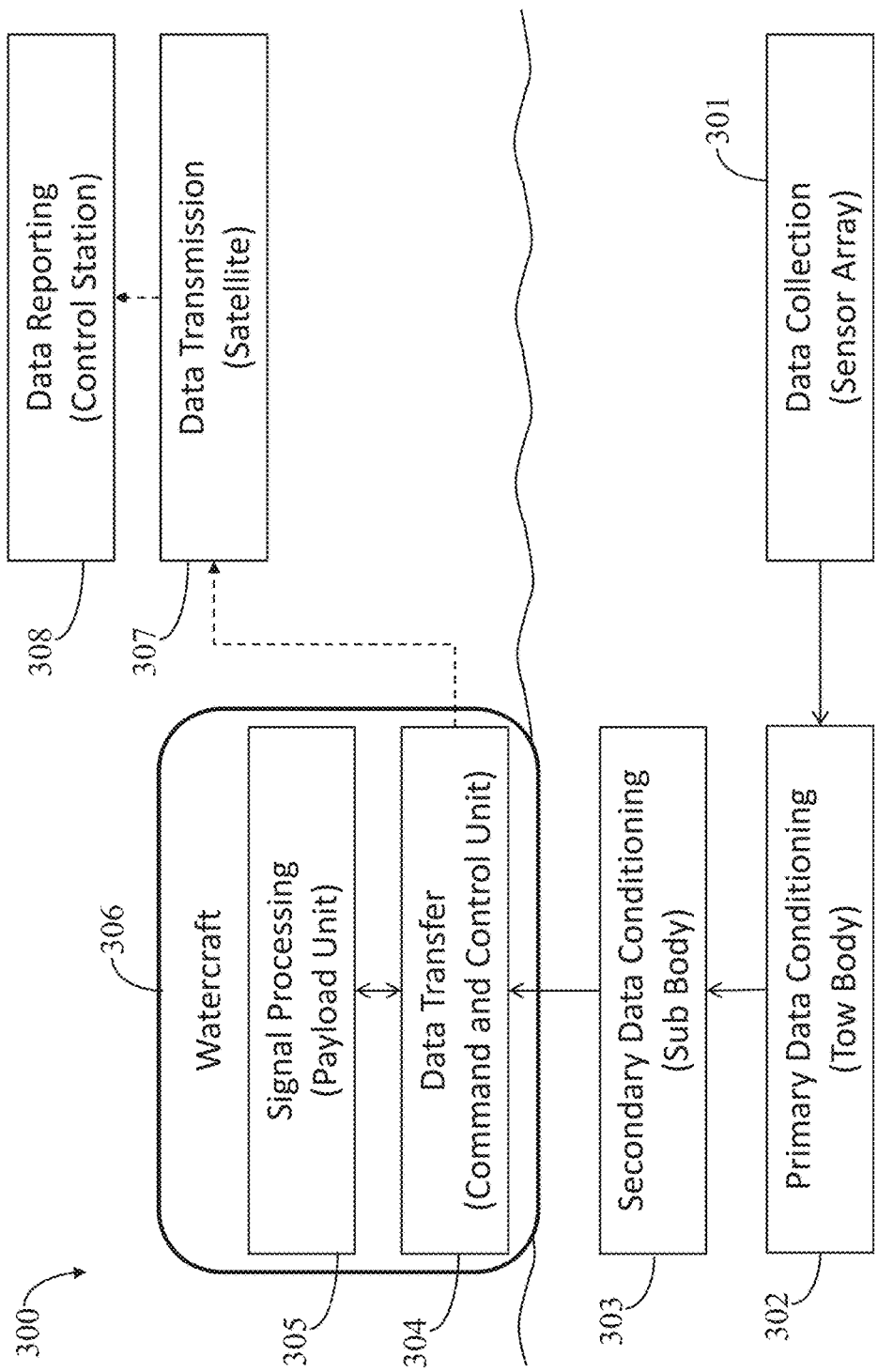
FIG. 3 shows an exemplary flowchart for the collection and reporting of sensor data.

FIG. 3 is an exemplary flowchart describing a process of data collection and reporting 300. In this embodiment, the sensor array performs the data collection 301, whereas the collected data is transferred to the tow body for primary data conditioning 302, and wherein the primarily conditioned data is further sent to the sub body for secondary data conditioning 303. In this embodiment the data conditioning steps 302, 303 reduce the amount of data that is sent to the watercraft 306, thus decreasing the bandwidth requirement and the necessary cable diameters. In this case, aboard the watercraft 306, the command and control unit transfers 304 the conditioned data to the payload unit, wherein the payload unit performs a step of signal processing 305. Once the processed data from the payload unit is transferred 304 to command and control unit transfers 304 the processed data to a satellite, and the satellite transmits 307 the processed data to the control station. Because, in this embodiment, the data transfer step 304 in the data collection and reporting process 300 is performed by the above-water (e.g., surface)

watercraft 306, said data transfer step 304 is optionally performed periodically, semi-continuously, continuously, or in real-time (e.g., live data stream) while collecting data 301 uninterruptedly. Finally, in this embodiment, once the control station receives the processed data transmitted 307 by the satellite the control station reports the data 308 to a control station for consumption by a user.

Control Station

In some embodiments, a control station comprises a processor, a memory and an operating system.

In some embodiments, the control center includes one or more processors. A suitable processor includes, by way of non-limiting examples, server computers, desktop computers, laptop computers, notebook computers, sub-notebook computers, netbook computers, netpad computers, and vehicles. Suitable tablet computers include those with booklet, slate, and convertible configurations, known to those of skill in the art.

In some embodiments, the control center includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the control station includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare® Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing.

In some embodiments, the control station comprises a cloud computer system. Those of skill in the art will recognize that suitable cloud computer systems include, by way of non-limiting examples, Wi-Fi, radio frequency, wires, or other mechanism communicate to a server that can store data in the cloud, or a hard drive, or in a data historian Humans may play some role in the form of gathering, analyzing, or manipulating this data.

In some embodiments, the control station contains a system for tampering prevention. In some embodiments, the system for tampering prevention comprises encryption, cryptography, or any combination thereof.

Those of skill will recognize that the various illustrative logical blocks, modules, circuits, and algorithm steps described in connection with the embodiments disclosed herein, including with reference to the control systems described herein, for example, may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a Raspberry PI further comprising Arduinos, a plurality of microprocessors, one or more microprocessors in conjunction with a DSP core, or any other such configuration Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such the processor can read information from, and write information to, the storage medium. In the alternative, the storage medium may be integral to the processor. The processor and the storage medium may reside in an ASIC.

Unmanned Watercrafts

In some embodiments, an unmanned watercraft is either a surface vehicle or a submarine vehicle. In some embodiments, an unmanned watercraft comprises a ship, boat, an aerial drone, a hovercraft, a submarine, or any combination thereof.

In some embodiments, the unmanned watercraft further comprises a thrudder. In some embodiments, a thrudder, also termed auxiliary vectored thruster, is an engine or motor capable of manipulating its direction of thrust to control the attitude or angular velocity of a vehicle.

In a particular embodiment, the unmanned watercraft comprise a Liquid Robotics Wave Glider®.

Tow Cable

In some embodiments, the length of the tow cable is about 100 feet to about 1,000 feet. In some embodiments, the length of the tow cable is at least about 100 feet. In some embodiments, the length of the tow cable is at most about 100 feet. In various embodiments, the length of the tow cable is about 100 feet, about 200 feet, about 300 feet, about 400 feet, about 500 feet, about 600 feet, about 700 feet, about 800 feet, about 900 feet, or about 1,000 feet, including increments therein. In various further embodiments, the length of the tow cable is about 100 feet to about 200 feet, about 100 feet to about 300 feet, about 100 feet to about 400 feet, about 100 feet to about 500 feet, about 100 feet to about 600 feet, about 100 feet to about 700 feet, about 100 feet to about 800 feet, about 100 feet to about 900 feet, about 100 feet to about 1,000 feet, about 200 feet to about 300 feet, about 200 feet to about 400 feet, about 200 feet to about 500 feet, about 200 feet to about 600 feet, about 200 feet to about 700 feet, about 200 feet to about 800 feet, about 200 feet to about 900 feet, about 200 feet to about 1,000 feet, about 300 feet to about 400 feet, about 300 feet to about 500 feet, about 300 feet to about 600 feet, about 300 feet to about 700 feet, about 300 feet to about 800 feet, about 300 feet to about 900 feet, about 300 feet to about 1,000 feet, about 400 feet to about 500 feet, about 400 feet to about 600 feet, about 400 feet to about 700 feet, about 400 feet to about 800 feet, about 400 feet to about 900 feet, about 400 feet to about 1,000 feet, about 500 feet to about 600 feet, about 500 feet to about 700 feet, about 500 feet to about 800 feet, about 500 feet to about 900 feet, about 500 feet to about 1,000 feet, about 600 feet to about 700 feet, about 600 feet to about 800 feet, about 600 feet to about 900 feet, about 600 feet to about 1,000 feet, about 700 feet to about 800 feet, about 700 feet to about 900 feet, about 700 feet to about 1,000 feet, about 800 feet to about 900 feet, about 800 feet to about 1,000 feet, or about 900 feet to about 1,000 feet.

In some embodiments, the diameter of the tow cable is about 0.5 millimeters to about 9 millimeters. In some embodiments, the diameter of the tow cable is at least about 0.5 millimeter. In some embodiments, the diameter of the tow cable is at most about 9 millimeters. In some embodiments, the diameter of the tow cable is about 1 millimeter to about 2 millimeters. In various embodiments, the diameter of the tow cable is about 0.5 millimeters, about 0.75 millimeters, about 1 about millimeter, about 1.25 millimeters, about 1.5 millimeters, about 2 millimeters, about 3 millimeters, about 4 millimeters, about 5 millimeters, about 6 millimeters, about 7 millimeters, or about 9 millimeters, including increments therein. In further various embodiments, the diameter of the tow cable is about 0.5 millimeters to about 0.75 millimeters, about 0.5 millimeters to about 1 millimeter, about 0.5 millimeters to about 1.25 millimeters, about 0.5 millimeters to about 1.5 millimeters, about 0.5 millimeters to about 2 millimeters, about 0.5 millimeters to about 3 millimeters, about 0.5 millimeters to about 4 millimeters, about 0.5 millimeters to about 6 millimeters, about 0.5 millimeters to about 7 millimeters, about 0.5 millimeters to about 9 millimeters, about 0.75 millimeters to about 1 millimeter, about 0.75 millimeters to about 1.25 millimeters, about 0.75 millimeters to about 1.5 millimeters, about 0.75 millimeters to about 2 millimeters, about 0.75 millimeters to about 3 millimeters, about 0.75 millimeters to about 4 millimeters, about 0.75 millimeters to about 6 millimeters, about 0.75 millimeters to about 7 millimeters, about 0.75 millimeters to about 9 millimeters, about 1 millimeter to about 1.25 millimeters, about 1 millimeter to about 1.5 millimeters, about 1 millimeter to about 2 millimeters, about 1 millimeter to about 3 millimeters, about 1 millimeter to about 4 millimeters, about 1 millimeter to about 6 millimeters, about 1 millimeter to about 7 millimeters, about 1 millimeter to about 9 millimeters, about 1.25 millimeters to about 1.5 millimeters, about 1.25 millimeters to about 2 millimeters, about 1.25 millimeters to about 3 millimeters, about 1.25 millimeters to about 4 millimeters, about 1.25 millimeters to about 6 millimeters, about 1.25 millimeters to about 7 millimeters, about 1.25 millimeters to about 9 millimeters, about 1.5 millimeters to about 2 millimeters, about 1.5 millimeters to about 3 millimeters, about 1.5 millimeters to about 4 millimeters, about 1.5 millimeters to about 6 millimeters, about 1.5 millimeters to about 7 millimeters, about 1.5 millimeters to about 9 millimeters, about 2 millimeters to about 3 millimeters, about 2 millimeters to about 4 millimeters, about 2 millimeters to about 6 millimeters, about 2 millimeters to about 7 millimeters, about 2 millimeters to about 9 millimeters, about 3 millimeters to about 4 millimeters, about 3 millimeters to about 6 millimeters, about 3 millimeters to about 7 millimeters, about 3 millimeters to about 9 millimeters, about 4 millimeters to about 6 millimeters, about 4 millimeters to about 7 millimeters, about 4 millimeters to about 9 millimeters, about 6 millimeters to about 7 millimeters, about 6 millimeters to about 9 millimeters, or about 7 millimeters to about 9 millimeters.

In some embodiments, the tow cable is comprised of a fiber optic core, a metallic coating, a carbon coating and an insulation layer.

In some embodiments, the thickness of the tow cable is about 0.6 millimeters to about 1.2 millimeters. In various embodiments, the thickness of the tow cable is about 0.6 millimeters, 0.7 millimeters, 0.8 millimeters, 0.9 millimeters, 1 millimeter, 1.1 millimeters, 1.2 millimeters, 1.3 millimeters, 1.4 millimeters, 1.5 millimeters, 2 millimeters, or 2.5 millimeters, including increments therein. In further various embodiments, the thickness of the tow cable is about 0.6 millimeters to about 0.7 millimeters, about 0.6 millimeters to about 0.8 millimeters, about 0.6 millimeters to about 0.9 millimeters, about 0.6 millimeters to about 1 millimeter, about 0.6 millimeters to about 1.1 millimeters, about 0.6 millimeters to about 1.2 millimeters, about 0.6 millimeters to about 1.3 millimeters, about 0.6 millimeters to about 1.4 millimeters, about 0.6 millimeters to about 1.5 millimeters, about 0.6 millimeters to about 2 millimeters, about 0.6 millimeters to about 2.5 millimeters, about 0.7 millimeters to about 0.8 millimeters, about 0.7 millimeters to about 0.9 millimeters, about 0.7 millimeters to about 1 millimeter, about 0.7 millimeters to about 1.1 millimeters, about 0.7 millimeters to about 1.2 millimeters, about 0.7 millimeters to about 1.3 millimeters, about 0.7 millimeters to about 1.4 millimeters, about 0.7 millimeters to about 1.5 millimeters, about 0.7 millimeters to about 2 millimeters, about 0.7 millimeters to about 2.5 millimeters, about 0.8 millimeters to about 0.9 millimeters, about 0.8 millimeters to about 1 millimeter, about 0.8 millimeters to about 1.1 millimeters, about 0.8 millimeters to about 1.2 millimeters, about 0.8 millimeters to about 1.3 millimeters, about 0.8 millimeters to about 1.4 millimeters, about 0.8 millimeters to about 1.5 millimeters, about 0.8 millimeters to about 2 millimeters, about 0.8 millimeters to about 2.5 millimeters, about 0.9 millimeters to about 1 millimeter, about 0.9 millimeters to about 1.1 millimeters, about 0.9 millimeters to about 1.2 millimeters, about 0.9 millimeters to about 1.3 millimeters, about 0.9 millimeters to about 1.4 millimeters, about 0.9 millimeters to about 1.5 millimeters, about 0.9 millimeters to about 2 millimeters, about 0.9 millimeters to about 2.5 millimeters, about 1 millimeter to about 1.1 millimeters, about 1 millimeter to about 1.2 millimeters, about 1 millimeter to about 1.3 millimeters, about 1 millimeter to about 1.4 millimeters, about 1 millimeter to about 1.5 millimeters, about 1 millimeter to about 2 millimeters, about 1 millimeter to about 2.5 millimeters, about 1.1 millimeters to about 1.2 millimeters, about 1.1 millimeters to about 1.3 millimeters, about 1.1 millimeters to about 1.4 millimeters, about 1.1 millimeters to about 1.5 millimeters, about 1.1 millimeters to about 2 millimeters, about 1.1 millimeters to about 2.5 millimeters, about 1.2 millimeters to about 1.3 millimeters, about 1.2 millimeters to about 1.4 millimeters, about 1.2 millimeters to about 1.5 millimeters, about 1.2 millimeters to about 2 millimeters, about 1.2 millimeters to about 2.5 millimeters, about 1.3 millimeters to about 1.4 millimeters, about 1.3 millimeters to about 1.5 millimeters, about 1.3 millimeters to about 2 millimeters, about 1.3 millimeters to about 2.5 millimeters, about 1.4 millimeters to about 1.5 millimeters, about 1.4 millimeters to about 2 millimeters, about 1.4 millimeters to about 2.5 millimeters, about 1.5 to about 2 millimeters, about 1.5 to about 2.5 millimeters, or about 2 to about 2.5 millimeters.

In some embodiments, a carbon coating increases the durability of optical fibers. In some embodiments, the carbon hermetically seals the optical fiber's surfaces and impedes crack growth caused by moisture ingression. In some embodiments, a carbon coating increases the fatigue factor of an optical fiber cable, a measure of the fatigue resistance, by about five times. As such, in some embodiments, a carbon coated fiber optic cable may operate for an increased period of time or at a higher stress level for the same lifetime than a non-carbon coated fiber. In some embodiments, the thickness of the carbon coating is about a few hundred Angstroms. In some embodiments, the thickness of the carbon coating is about 100 Angstroms to about 400 Angstroms. In various embodiments, the thickness of the carbon coating is about 100 Angstroms, about 150 Angstroms, about 200 Angstroms, about 250 Angstroms, about 300 Angstroms, about 350 Angstroms, or about 400 Angstroms, including increments therein. In various further embodiments, the thickness of the carbon coating is about 100 Angstroms to about 150 Angstroms, about 100 Angstroms to about 200 Angstroms, about 100 Angstroms to about 250 Angstroms, about 100 Angstroms to about 300 Angstroms, about 100 Angstroms to about 350 Angstroms, about 100 Angstroms to about 400 Angstroms, about 150 Angstroms to about 200 Angstroms, about 150 Angstroms to about 250 Angstroms, about 150 Angstroms to about 300 Angstroms, about 150 Angstroms to about 350 Angstroms, about 150 Angstroms to about 400 Angstroms, about 200 Angstroms to about 250 Angstroms, about 200 Angstroms to about 300 Angstroms, about 200 Angstroms to about 350 Angstroms, about 200 Angstroms to about 400 Angstroms, about 250 Angstroms to about 300 Angstroms, about 250 Angstroms to about 350 Angstroms, about 250 Angstroms to about 400 Angstroms, about 300 Angstroms to about 350 Angstroms, about 300 Angstroms to about 400 Angstroms, or about 350 Angstroms to about 400 Angstroms.

In some embodiments, the insulation layer is comprised of polyimide, Kapton, Teflon, plastic, epoxy, glue, cement, mucilage, paste, plastic, wood, carbon fiber, fiberglass, glass, metal or any combination thereof. In some embodiments, the insulation layer is comprised of bulk fiber polyimide.

In some embodiments, fiber optics that are capable of transmitting multiple propagation paths or transverse modes are called multi-mode fibers (MMF). In some embodiments, fiber optics that are capable of transmitting a single propagation path are called single-mode fibers (SMF). In some embodiments, the fiber optic core comprises a multi-mode fiber. In some embodiments, the fiber optic core comprises a single-mode fiber. In some embodiments, the fiber optic core has a diameter of about 50 microns to about 200 microns. In various embodiments, the fiber optic core has a diameter of about 50 microns, 75 microns, 100 microns, 125 microns, 150 microns, or 200 microns. In various further embodiments, the fiber optic core has a diameter of about 50 microns to about 75 microns, about 50 microns to about 100 microns, about 50 microns to about 125 microns, about 50 microns to about 150 microns, about 50 microns to about 200 microns, about 75 microns to about 100 microns, about 75 microns to about 125 microns, about 75 microns to about 150 microns, about 75 microns to about 200 microns, about 100 microns to about 125 microns, about 100 microns to about 150 microns, about 100 microns to about 200 microns, about 125 microns to about 150 microns, about 125 microns to about 200 microns, or about 150 microns to about 200 microns.

In some embodiments, the metal conductor completely surrounds the optic fiber. In some embodiments, the metal conductor provides support for the tow cable. In some embodiments, the metal conductor transmits power.

In a particular embodiment, the tow cable is produced by Nufern.

Floats

In some embodiments, floats, also called buoys, are airtight flotation devices whose density is lower than water. In some embodiments, this density dissimilarity may impart a buoyancy force, or upthrust, exerted by the water equal to the mass of water displaced by the float. A float may be comprised of plastic, foam, glass, wood, metal, fiberglass, carbon fiber or any combination thereof.

In some embodiments, the number of floats on the tow cable is at least about 1. In some embodiments, the number of floats on the tow cable is at most about 200. In some embodiments, the number of floats on the tow cable is about 1 to about 200. In various embodiments, the number of floats on the tow cable is about 1 to about 5, about 1 to about 10, about 1 to about 25, about 1 to about 50, about 1 to about 75, about 1 to about 100, about 1 to about 150, about 1 to about 200, about 5 to about 10, about 5 to about 25, about 5 to about 50, about 5 to about 75, about 5 to about 100, about 5 to about 150, about 5 to about 200, about 10 to about 25, about 10 to about 50, about 10 to about 75, about 10 to about 100, about 10 to about 150, about 10 to about 200, about 25 to about 50, about 25 to about 75, about 25 to about 100, about 25 to about 150, about 25 to about 200, about 50 to about 75, about 50 to about 100, about 50 to about 150, about 50 to about 200, about 75 to about 100, about 75 to about 150, about 75 to about 200, about 100 to about 150, about 100 to about 200, or about 150 to about 200.

In some embodiments, the number of floats on the tow cable is about 1 to about 200. In some embodiments, the number of floats on the tow cable is at least about 1. In some embodiments, the number of floats on the tow cable is at most about 200. In various embodiments, the number of floats on the tow cable is about 1, about 5, about 10, about 20, about 50, about 100, about 150, or about 200, including increments therein. In various further embodiments, the number of floats on the tow cable is about, about 1 to about 5, about 1 to about 10, about 1 to about 20, about 1 to about 50, about 1 to about 100, about 1 to about 150, about 1 to about 200, about 5 to about 10, about 5 to about 20, about 5 to about 50, about 5 to about 100, about 5 to about 150, about 5 to about 200, about 10 to about 20, about 10 to about 50, about 10 to about 100, about 10 to about 150, about 10 to about 200, about 20 to about 50, about 20 to about 100, about 20 to about 150, about 20 to about 200, about 50 to about 100, about 50 to about 150, about 50 to about 200, about 100 to about 150, about 100 to about 200, or about 150 to about 200.

In some embodiments, the floats each have a buoyancy of about 0.1 pounds to about 50 pounds. In some embodiments, the floats each have a buoyancy of at least about 0.1 pounds.

In some embodiments, the floats each have a buoyancy of at most about 50 pounds. In various embodiments, the floats each have a buoyancy of about 0.1 pounds, about 0.5 pounds, about 1 pound, about 5 pounds, about 10 pounds, about 20 pounds, about 30 pounds, about 40 pounds, or about 50 pounds, including increments therein. In various further embodiments, the floats each have a buoyancy of about 0.1 pounds to about 0.5 pounds, about 0.1 pounds to about 1 pounds, about 0.1 pounds to about 5 pounds, about 0.1 pounds to about 10 pounds, about 0.1 pounds to about 20 pounds, about 0.1 pounds to about 30 pounds, about 0.1 pounds to about 40 pounds, about 0.1 pounds to about 50 pounds, about 0.5 pounds to about 1 pounds, about 0.5 pounds to about 5 pounds, about 0.5 pounds to about 10 pounds, about 0.5 pounds to about 20 pounds, about 0.5 pounds to about 30 pounds, about 0.5 pounds to about 40 pounds, about 0.5 pounds to about 50 pounds, about 1 pounds to about 5 pounds, about 1 pounds to about 10 pounds, about 1 pounds to about 20 pounds, about 1 pounds to about 30 pounds, about 1 pounds to about 40 pounds, about 1 pounds to about 50 pounds, about 5 pounds to about 10 pounds, about 5 pounds to about 20 pounds, about 5 pounds to about 30 pounds, about 5 pounds to about 40 pounds, about 5 pounds to about 50 pounds, about 10 pounds to about 20 pounds, about 10 pounds to about 30 pounds, about 10 pounds to about 40 pounds, about 10 pounds to about 50 pounds, about 20 pounds to about 30 pounds, about 20 pounds to about 40 pounds, about 20 pounds to about 50 pounds, about 30 pounds to about 40 pounds, about 30 pounds to about 50 pounds, or about 40 pounds to about 50 pounds.

Weights

In some embodiments, weights, also called sinkers, are negative buoyancy devices whose density is higher than water. In some embodiments, this density dissimilarity may impart a downwards sinking force. In some embodiments, a weight attached to a towed flexible member can impart a straightening tension force. A weight may be comprised of iron, lead, steel, stainless steel or any other metal or metal alloy.

In some embodiments, the number of weights on the tow cable is at least about 1. In some embodiments, the number of weights on the tow cable is at most about 200. In some embodiments, the number of weights on the tow cable is about 1 to about 200. In various embodiments, the number of weights on the tow cable is about 1, about 5, about 10, about 20, about 50, about 100, about 150, or about 200, including increments therein. In various further embodiments, the number of weights on the tow cable is about 1 to about 5, about 1 to about 10, about 1 to about 20, about 1 to about 50, about 1 to about 100, about 1 to about 150, about 1 to about 200, about 5 to about 10, about 5 to about 20, about 5 to about 50, about 5 to about 100, about 5 to about 150, about 5 to about 200, about 10 to about 20, about 10 to about 50, about 10 to about 100, about 10 to about 150, about 10 to about 200, about 20 to about 50, about 20 to about 100, about 20 to about 150, about 20 to about 200, about 50 to about 100, about 50 to about 150, about 50 to about 200, about 100 to about 150, about 100 to about 200, or about 150 to about 200.

In some embodiments, the weights each have a mass of about 0.1 pounds to about 50 pounds. In some embodiments, the weights each have a mass of at least about 0.1 pounds. In some embodiments, the weights each have a mass of at most about 50 pounds. In various embodiments, the weights each have a mass of about 0.1 pounds, about 0.5 pounds, about 1 pound, about 5 pounds, about 10 pounds, about 20 pounds, about 30 pounds, about 40 pounds, or about 50 pounds, including increments therein. In various further embodiments, the weights each have a buoyancy of about 0.1 pounds to about 0.5 pounds, about 0.1 pounds to about 1 pounds, about 0.1 pounds to about 5 pounds, about 0.1 pounds to about 10 pounds, about 0.1 pounds to about 20 pounds, about 0.1 pounds to about 30 pounds, about 0.1 pounds to about 40 pounds, about 0.1 pounds to about 50 pounds, about 0.5 pounds to about 1 pounds, about 0.5 pounds to about 5 pounds, about 0.5 pounds to about 10 pounds, about 0.5 pounds to about 20 pounds, about 0.5 pounds to about 30 pounds, about 0.5 pounds to about 40 pounds, about 0.5 pounds to about 50 pounds, about 1 pounds to about 5 pounds, about 1 pounds to about 10 pounds, about 1 pounds to about 20 pounds, about 1 pounds to about 30 pounds, about 1 pounds to about 40 pounds, about 1 pounds to about 50 pounds, about 5 pounds to about 10 pounds, about 5 pounds to about 20 pounds, about 5 pounds to about 30 pounds, about 5 pounds to about 40 pounds, about 5 pounds to about 50 pounds, about 10 pounds to about 20 pounds, about 10 pounds to about 30 pounds, about 10 pounds to about 40 pounds, about 10 pounds to about 50 pounds, about 20 pounds to about 30 pounds, about 20 pounds to about 40 pounds, about 20 pounds to about 50 pounds, about 30 pounds to about 40 pounds, about 30 pounds to about 50 pounds, or about 40 pounds to about 50 pounds.

Tow Body

In some embodiments, a tow body, also called a drogue or a sea anchor, is a drag and negative buoyancy device whose density is higher than water. In some embodiments, the shape and size of the tow body is designed with a specific drag coefficient. In some embodiments, a drag coefficient is used to quantify the drag or resistance of an object in a fluid environment, such as air or water. In some embodiments, the drag equation is a dimensionless quantity, associated with a particular surface area, in which a lower drag coefficient indicates the object will have less aerodynamic or hydrodynamic drag. In some embodiments, a tow body attached to a towed flexible member can impart a straightening tension force. A tow body may be comprised of iron, lead, steel, stainless steel or any other metal or metal alloy.

In some embodiments, the tow body has a mass of about 1 pound to about 100 pounds. In some embodiments, the tow body has a mass of at least about 1 pound. In some embodiments, the tow body has a mass of at most about 100 pounds. In some embodiments, the tow body has a mass of about 20 pounds. In various embodiments, the tow body has a mass of about 1 pound, about 2 pounds, about 5 pounds, about 10 pounds, about 20 pounds, about 30 pounds, about 40 pounds, about 50 pounds, about 60 pounds, about 80 pounds, or about 100 pounds, including increments therein. In various further embodiments, the tow body has a mass of about 1 pounds to about 2 pounds, about 1 pounds to about 5 pounds, about 1 pounds to about 10 pounds, about 1 pounds to about 20 pounds, about 1 pounds to about 30 pounds, about 1 pounds to about 40 pounds, about 1 pounds to about 50 pounds, about 1 pounds to about 60 pounds, about 1 pounds to about 80 pounds, about 1 pounds to about 100 pounds, about 2 pounds to about 5 pounds, about 2 pounds to about 10 pounds, about 2 pounds to about 20 pounds, about 2 pounds to about 30 pounds, about 2 pounds to about 40 pounds, about 2 pounds to about 50 pounds, about 2 pounds to about 60 pounds, about 2 pounds to about 80 pounds, about 2 pounds to about 100 pounds, about 5 pounds to about 10 pounds, about 5 pounds to about 20 pounds, about 5 pounds to about 30 pounds, about 5 pounds to about 40 pounds, about 5 pounds to about 50 pounds, about 5 pounds to about 60 pounds, about 5 pounds to about 80 pounds, about 5 pounds to about 100 pounds, about 10 pounds to about 20 pounds, about 10 pounds to about 30 pounds, about 10 pounds to about 40 pounds, about 10 pounds to about 50 pounds, about 10 pounds to about 60 pounds, about 10 pounds to about 80 pounds, about 10 pounds to about 100 pounds, about 20 pounds to about 30 pounds, about 20 pounds to about 40 pounds, about 20 pounds to about 50 pounds, about 20 pounds to about 60 pounds, about 20 pounds to about 80 pounds, about 20 pounds to about 100 pounds, about 30 pounds to about 40 pounds, about 30 pounds to about 50 pounds, about 30 pounds to about 60 pounds, about 30 pounds to about 80 pounds, about 30 pounds to about 100 pounds, about 40 pounds to about 50 pounds, about 40 pounds to about 60 pounds, about 40 pounds to about 80 pounds, about 40 pounds to about 100 pounds, about 50 pounds to about 60 pounds, about 50 pounds to about 80 pounds, about 50 pounds to about 100 pounds, about 60 pounds to about 80 pounds, about 60 pounds to about 100 pounds, or about 80 pounds to about 100 pounds.

In some embodiments, the tow body has a drag coefficient of at least about 0.5. In some embodiments, the tow body has a drag coefficient of at most about 2.3. In some embodiments, the tow body has a drag coefficient of about 0.5 to about 2.3. In various embodiments, the tow body has a drag coefficient of about 0.5 to about 0.6, about 0.5 to about 0.7, about 0.5 to about 0.8, about 0.5 to about 0.9, about 0.5 to about 1, about 0.5 to about 1.25, about 0.5 to about 1.5, about 0.5 to about 1.75, about 0.5 to about 2, about 0.5 to about 2.25, about 0.5 to about 2.3, about 0.6 to about 0.7, about 0.6 to about 0.8, about 0.6 to about 0.9, about 0.6 to about 1, about 0.6 to about 1.25, about 0.6 to about 1.5, about 0.6 to about 1.75, about 0.6 to about 2, about 0.6 to about 2.25, about 0.6 to about 2.3, about 0.7 to about 0.8, about 0.7 to about 0.9, about 0.7 to about 1, about 0.7 to about 1.25, about 0.7 to about 1.5, about 0.7 to about 1.75, about 0.7 to about 2, about 0.7 to about 2.25, about 0.7 to about 2.3, about 0.8 to about 0.9, about 0.8 to about 1, about 0.8 to about 1.25, about 0.8 to about 1.5, about 0.8 to about 1.75, about 0.8 to about 2, about 0.8 to about 2.25, about 0.8 to about 2.3, about 0.9 to about 1, about 0.9 to about 1.25, about 0.9 to about 1.5, about 0.9 to about 1.75, about 0.9 to about 2, about 0.9 to about 2.25, about 0.9 to about 2.3, about 1 to about 1.25, about 1 to about 1.5, about 1 to about 1.75, about 1 to about 2, about 1 to about 2.25, about 1 to about 2.3, about 1.25 to about 1.5, about 1.25 to about 1.75, about 1.25 to about 2, about 1.25 to about 2.25, about 1.25 to about 2.3, about 1.5 to about 1.75, about 1.5 to about 2, about 1.5 to about 2.25, about 1.5 to about 2.3, about 1.75 to about 2, about 1.75 to about 2.25, about 1.75 to about 2.3, about 2 to about 2.25, about 2 to about 2.3, or about 2.25 to about 2.3.

Sensor Array

In some embodiments, a sensor array comprises one or more sensors. In some embodiments, a sensor refers to a device capable of detecting and/or recording data emitted from one or more sources. In some embodiments, a sensor comprises an acoustic sensor and/or a non-acoustic sensor. In some embodiments, an acoustic sensor comprises a condenser microphone, a dynamic microphone, a ribbon microphone, a USB microphone, a stereo microphone, a crystal microphone or any combination thereof. In some embodiments, an acoustic sensor comprises a hydrophone. In some embodiments, a hydrophone is a microphone designed for recording or listening to underwater sound. Some hydrophones may comprise a piezoelectric transducer that generates electricity when subjected to a pressure change created by a propagating sound wave.

In some embodiments, a non-acoustic sensor comprises a depth sensor and/or an electromagnetic sensor. In some embodiments, a depth sensor is a water depth measuring device including but not limited to: a pressure sensor, a bathymeter, an echosounder, an ultrasound meter, an ultrasound meter, a laser distance meter, or any combination thereof. In some embodiments, a sensor array comprises one or more hydrophones, and their associated electronics, housed within a flexible tube.

In some embodiments, a sensor array is shaped as an open chain, a closed loop, a reticulum or any combination thereof. In some embodiments, an open chain refers to a linear structure that may or may not contain branches. In some embodiments, a closed loop refers to a series with a single cyclical structure that may or may not contain branches. In some embodiments, a reticulum refers to a series with more than one cyclical structure that may or may not contain branches.

In some embodiments, the length of the sensor array is about 6 feet to about 600 feet. In some embodiments, the length of the sensor array is at least about 6 feet. In some embodiments, the length of the sensor array is at most 600 feet. In some embodiments, the length of the sensor array is about 125 feet. In various embodiments, the length of the sensor array is about 6 feet, about 10 feet, about 25 feet, about 50 feet, about 75 feet, about 100 feet, about 200 feet, about 300 feet, about 400 feet, about 500 feet, or about 600 feet, including increments therein. In various further embodiments, the length of the sensor array is about 6 feet to about 10 feet, about 6 feet to about 25 feet, about 6 feet to about 50 feet, about 6 feet to about 75 feet, about 6 feet to about 100 feet, about 6 feet to about 200 feet, about 6 feet to about 300 feet, about 6 feet to about 400 feet, about 6 feet to about 500 feet, about 6 feet to about 600 feet, about 10 feet to about 25 feet, about 10 feet to about 50 feet, about 10 feet to about 75 feet, about 10 feet to about 100 feet, about 10 feet to about 200 feet, about 10 feet to about 300 feet, about 10 feet to about 400 feet, about 10 feet to about 500 feet, about 10 feet to about 600 feet, about 25 feet to about 50 feet, about 25 feet to about 75 feet, about 25 feet to about 100 feet, about 25 feet to about 200 feet, about 25 feet to about 300 feet, about 25 feet to about 400 feet, about 25 feet to about 500 feet, about 25 feet to about 600 feet, about 50 feet to about 75 feet, about 50 feet to about 100 feet, about 50 feet to about 200 feet, about 50 feet to about 300 feet, about 50 feet to about 400 feet, about 50 feet to about 500 feet, about 50 feet to about 600 feet, about 75 feet to about 100 feet, about 75 feet to about 200 feet, about 75 feet to about 300 feet, about 75 feet to about 400 feet, about 75 feet to about 500 feet, about 75 feet to about 600 feet, about 100 feet to about 200 feet, about 100 feet to about 300 feet, about 100 feet to about 400 feet, about 100 feet to about 500 feet, about 100 feet to about 600 feet, about 200 feet to about 300 feet, about 200 feet to about 400 feet, about 200 feet to about 500 feet, about 200 feet to about 600 feet, about 300 feet to about 400 feet, about 300 feet to about 500 feet, about 300 feet to about 600 feet, about 400 feet to about 500 feet, about 400 feet to about 600 feet, or about 500 feet to about 600 feet.

In some embodiments, the quantity of sensors per foot of the length of the sensor array is about 0.1 to about 8. In some embodiments, the quantity of sensors per foot of the length of the sensor array is at least about 0.1. In some embodiments, the quantity of sensors per foot of the length of the sensor array is at most about 8. In some embodiments, the quantity of sensors per foot of the length of the sensor array is about 4. In various embodiments, the quantity of sensors per foot of the length of the sensor array is about 0.1, about 0.5, about 1, about 2, about 3, about 4, about 5, about 6, about 7, or about 8, including increments therein. In some embodiments, the quantity of sensors per foot of the length of the sensor array is about 0.1 to about 0.5, about 0.1 to about 1, about 0.1 to about 2, about 0.1 to about 3, about 0.1 to about 4, about 0.1 to about 5, about 0.1 to about 6, about 0.1 to about 7, about 0.1 to about 8, about 0.5 to about 1, about 0.5 to about 2, about 0.5 to about 3, about 0.5 to about 4, about 0.5 to about 5, about 0.5 to about 6, about 0.5 to about 7, about 0.5 to about 8, about 1 to about 1, about 1 to about 2, about 1 to about 3, about 1 to about 4, about 1 to about 5, about 1 to about 6, about 1 to about 7, about 1 to about 8, about 2 to about 2, about 2 to about 3, about 2 to about 4, about 2 to about 5, about 2 to about 6, about 2 to about 7, about 2 to about 8, about 3 to about 3, about 3 to about 4, about 3 to about 5, about 3 to about 6, about 3 to about 7, about 3 to about 8, about 4 to about 4, about 4 to about 5, about 4 to about 6, about 4 to about 7, about 4 to about 8, about 5 to about 5, about 5 to about 6, about 5 to about 7, about 5 to about 8, about 6 to about 6, about 6 to about 7, about 6 to about 8, or about 7 to about 8.

Performance Characteristics

In some embodiments, the sensor array positioning system is capable of towing the sensor array at a depth of more than about 100 meters. In some embodiments, the sensor array positioning system is capable of towing the sensor array at a depth of about 200 meters. In various embodiments, the sensor array positioning system is capable of towing the sensor array at a depth of about 100 meters, 120 meters, 140 meters, 160 meters, 180 meters, 200 meters, 220 meters, 240 meters, 260 meters, 280 meters, or 300 meters, including increments therein. In various further embodiments, the towed sensor array depth is about 100 meters to about 120 meters, about 100 meters to about 140 meters, about 100 meters to about 160 meters, about 100 meters to about 180 meters, about 100 meters to about 200 meters, about 100 meters to about 220 meters, about 100 meters to about 240 meters, about 100 meters to about 260 meters, about 100 meters to about 280 meters, about 100 meters to about 300 meters, about 120 meters to about 140 meters, about 120 meters to about 160 meters, about 120 meters to about 180 meters, about 120 meters to about 200 meters, about 120 meters to about 220 meters, about 120 meters to about 240 meters, about 120 meters to about 260 meters, about 120 meters to about 280 meters, about 120 meters to about 300 meters, about 140 meters to about 160 meters, about 140 meters to about 180 meters, about 140 meters to about 200 meters, about 140 meters to about 220 meters, about 140 meters to about 240 meters, about 140 meters to about 260 meters, about 140 meters to about 280 meters, about 140 meters to about 300 meters, about 160 meters to about 180 meters, about 160 meters to about 200 meters, about 160 meters to about 220 meters, about 160 meters to about 240 meters, about 160 meters to about 260 meters, about 160 meters to about 280 meters, about 180 meters to about 200 meters, about 180 meters to about 220 meters, about 180 meters to about 240 meters, about 180 meters to about 260 meters, about 180 meters to about 280 meters, about 180 meters to about 300 meters, about 200 meters to about 220 meters, about 200 meters to about 240 meters, about 200 meters to about 260 meters, about 200 meters to about 280 meters, about 200 meters to about 300 meters, about 220 meters to about 240 meters, about 220 meters to about 260 meters, about 220 meters to about 280 meters, about 220 meters to about 300 meters, about 240 meters to about 260 meters, about 240 meters to about 280 meters, about 240 meters to about 300 meters, about 260 meters to about 280 meters, about 260 meters to about 300 meters, or about 280 meters to about 300 meters.

In some embodiments, the sensor array positioning system is capable of operating for an uninterrupted period of about 2 days to about 300 days In some embodiments, the sensor array positioning system is capable of operating for an uninterrupted period of least about 2 days. In some embodiments, the sensor array positioning system is capable of operating for an uninterrupted period of at most about 300 days. In various embodiments, the system has an uninterrupted operation period of about 2 days, 5 days, 10 days, 20 days, 50 days, 75 days, 100 days, 150 days, 200 days, 250 days, or 300 days, including increments therein. In various further embodiments, the system has an uninterrupted operation period of about 2 days to about 5 days, about 2 days to about 10 days, about 2 days to about 20 days, about 2 days to about 50 days, about 2 days to about 75 days, about 2 days to about 100 days, about 2 days to about 150 days, about 2 days to about 200 days, about 2 days to about 250 days, about 2 days to about 300 days, about 5 days to about 10 days, about 5 days to about 20 days, about 5 days to about 50 days, about 5 days to about 75 days, about 5 days to about 100 days, about 5 days to about 150 days, about 5 days to about 200 days, about 5 days to about 250 days, about 5 days to about 300 days, about 10 days to about 20 days, about 10 days to about 50 days, about 10 days to about 75 days, about 10 days to about 100 days, about 10 days to about 150 days, about 10 days to about 200 days, about 10 days to about 250 days, about 10 days to about 300 days, about 20 days to about 50 days, about 20 days to about 75 days, about 20 days to about 100 days, about 20 days to about 150 days, about 20 days to about 200 days, about 20 days to about 250 days, about 20 days to about 300 days, about 50 days to about 75 days, about 50 days to about 100 days, about 50 days to about 150 days, about 50 days to about 200 days, about 50 days to about 250 days, about 50 days to about 300 days, about 75 days to about 100 days, about 75 days to about 150 days, about 75 days to about 200 days, about 75 days to about 250 days, about 75 days to about 300 days, about 100 days to about 150 days, about 100 days to about 200 days, about 100 days to about 250 days, about 100 days to about 300 days, about 150 days to about 200 days, about 150 days to about 250 days, about 150 days to about 300 days, about 200 days to about 250 days, about 200 days to about 300 days, or about 250 days to about 300 days.

In some embodiments, the watercraft uses less than about 10 Watts of power. In some embodiments, the watercraft uses less than about 9 Watts of power. In some embodiments, the watercraft uses less than about 8 Watts of power. In some embodiments, the watercraft uses less than about 7 Watts of power. In some embodiments, the watercraft uses less than about 6 Watts of power. In some embodiments, the watercraft uses less than about 5 Watts of power. In some embodiments, the watercraft uses less than about 4 Watts of power. In some embodiments, the watercraft uses less than about 3 Watts of power.

In some embodiments, the sensor can be towed at a speed of less than about 6 knots. In some embodiments, the sensor can be towed at a speed of less than about 5 knots. In some embodiments, the sensor can be towed at a speed of less than about 4 knots. In some embodiments, the sensor can be towed at a speed of less than about 3 knots. In some embodiments, the sensor can be towed at a speed of about 2 knots.

Method Parameters

In some embodiments, the step of the autonomous sensor array positioning system modifying its position is not implemented if the location measurement reading in the step of the autonomous sensor array positioning system measuring its current position is within a set accuracy of the respective autonomous watercraft's stored target position. In some embodiments, the set accuracy is about 0.01 nautical miles to 10 nautical miles. In some embodiments, the set accuracy is at most about 0.01 nautical miles. In some embodiments, the set accuracy is at most about 10 nautical miles. In various embodiments, the set accuracy is about 0.01 nautical miles, 0.05 nautical miles, 0.1 nautical miles, 0.5 nautical miles, 1 nautical mile, 2 nautical miles, 3 nautical miles, 4 nautical miles, 5 nautical miles, 6 nautical miles, 8 nautical miles, or 10 nautical miles, including increments therein. In various further embodiments, the set accuracy is about 0.01 nautical miles to about 0.05 nautical miles, about 0.01 nautical miles to about 0.1 nautical miles, about 0.01 nautical miles to about 0.5 nautical miles, about 0.01 nautical miles to about 1 nautical mile, about 0.01 nautical miles to about 2 nautical miles, about 0.01 nautical miles to about 3 nautical miles, about 0.01 nautical miles to about 4 nautical miles, about 0.01 nautical miles to about 5 nautical miles, about 0.01 nautical miles to about 6 nautical miles, about 0.01 nautical miles to about 8 nautical miles, about 0.01 nautical miles to about 10 nautical miles, about 0.05 nautical miles to about 0.1 nautical miles, about 0.05 nautical miles to about 0.5 nautical miles, about 0.05 nautical miles to about 1 nautical mile, about 0.05 nautical miles to about 2 nautical miles, about 0.05 nautical miles to about 3 nautical miles, about 0.05 nautical miles to about 4 nautical miles, about 0.05 nautical miles to about 5 nautical miles, about 0.05 nautical miles to about 6 nautical miles, about 0.05 nautical miles to about 8 nautical miles, about 0.05 nautical miles to about 10 nautical miles, about 0.1 nautical miles to about 0.5 nautical miles, about 0.1 nautical miles to about 1 nautical mile, about 0.1 nautical miles to about 2 nautical miles, about 0.1 nautical miles to about 3 nautical miles, about 0.1 nautical miles to about 4 nautical miles, about 0.1 nautical miles to about 5 nautical miles, about 0.1 nautical miles to about 6 nautical miles, about 0.1 nautical miles to about 8 nautical miles, about 0.1 nautical miles to about 10 nautical miles, about 0.5 nautical miles to about 1 nautical mile, about 0.5 nautical miles to about 2 nautical miles, about 0.5 nautical miles to about 3 nautical miles, about 0.5 nautical miles to about 4 nautical miles, about 0.5 nautical miles to about 5 nautical miles, about 0.5 nautical miles to about 6 nautical miles, about 0.5 nautical miles to about 8 nautical miles, about 0.5 nautical miles to about 10 nautical miles, about 1 nautical mile to about 2 nautical miles, about 1 nautical mile to about 3 nautical miles, about 1 nautical mile to about 4 nautical miles, about 1 nautical mile to about 5 nautical miles, about 1 nautical mile to about 6 nautical miles, about 1 nautical mile to about 8 nautical miles, about 1 nautical mile to about 10 nautical miles, about 2 nautical miles to about 3 nautical miles, about 2 nautical miles to about 4 nautical miles, about 2 nautical miles to about 5 nautical miles, about 2 nautical miles to about 6 nautical miles, about 2 nautical miles to about 8 nautical miles, about 2 nautical miles to about 10 nautical miles, about 3 nautical miles to about 4 nautical miles, about 3 nautical miles to about 5 nautical miles, about 3 nautical miles to about 6 nautical miles, about 3 nautical miles to about 8 nautical miles, about 3 nautical miles to about 10 nautical miles, about 4 nautical miles to about 5 nautical miles, about 4 nautical miles to about 6 nautical miles, about 4 nautical miles to about 8 nautical miles, about 4 nautical miles to about 10 nautical miles, about 5 nautical miles to about 6 nautical miles, about 5 nautical miles to about 8 nautical miles, about 5 nautical miles to about 10 nautical miles, about 6 nautical miles to about 8 nautical miles, about 6 nautical miles to about 10 nautical miles, or about 8 nautical miles to about 10 nautical miles.

Some embodiments further comprise the autonomous sensor positioning system overriding a stored target positions with a respective stored location measurement if the location measurement reading is within a set accuracy of the respective autonomous watercraft's stored target position. In some embodiments, the set accuracy is about 0.01 nautical miles to 10 nautical miles. In some embodiments, the set accuracy is at most about 0.01 nautical miles. In some embodiments, the set accuracy is at most about 10 nautical miles. In various embodiments, the set accuracy is about 0.01 nautical miles, 0.05 nautical miles, 0.1 nautical miles, 0.5 nautical miles, 1 nautical mile, 2 nautical miles, 3 nautical miles, 4 nautical miles, 5 nautical miles, 6 nautical miles, 8 nautical miles, or 10 nautical miles, including increments therein. In various further embodiments, the set accuracy is about 0.01 nautical miles to about 0.05 nautical miles, about 0.01 nautical miles to about 0.1 nautical miles, about 0.01 nautical miles to about 0.5 nautical miles, about 0.01 nautical miles to about 1 nautical mile, about 0.01 nautical miles to about 2 nautical miles, about 0.01 nautical miles to about 3 nautical miles, about 0.01 nautical miles to about 4 nautical miles, about 0.01 nautical miles to about 5 nautical miles, about 0.01 nautical miles to about 6 nautical miles, about 0.01 nautical miles to about 8 nautical miles, about 0.01 nautical miles to about 10 nautical miles, about 0.05 nautical miles to about 0.1 nautical miles, about 0.05 nautical miles to about 0.5 nautical miles, about 0.05 nautical miles to about 1 nautical mile, about 0.05 nautical miles to about 2 nautical miles, about 0.05 nautical miles to about 3 nautical miles, about 0.05 nautical miles to about 4 nautical miles, about 0.05 nautical miles to about 5 nautical miles, about 0.05 nautical miles to about 6 nautical miles, about 0.05 nautical miles to about 8 nautical miles, about 0.05 nautical miles to about 10 nautical miles, about 0.1 nautical miles to about 0.5 nautical miles, about 0.1 nautical miles to about 1 nautical mile, about 0.1 nautical miles to about 2 nautical miles, about 0.1 nautical miles to about 3 nautical miles, about 0.1 nautical miles to about 4 nautical miles, about 0.1 nautical miles to about 5 nautical miles, about 0.1 nautical miles to about 6 nautical miles, about 0.1 nautical miles to about 8 nautical miles, about 0.1 nautical miles to about 10 nautical miles, about 0.5 nautical miles to about 1 nautical mile, about 0.5 nautical miles to about 2 nautical miles, about 0.5 nautical miles to about 3 nautical miles, about 0.5 nautical miles to about 4 nautical miles, about 0.5 nautical miles to about 5 nautical miles, about 0.5 nautical miles to about 6 nautical miles, about 0.5 nautical miles to about 8 nautical miles, about 0.5 nautical miles to about 10 nautical miles, about 1 nautical mile to about 2 nautical miles, about 1 nautical mile to about 3 nautical miles, about 1 nautical mile to about 4 nautical miles, about 1 nautical mile to about 5 nautical miles, about 1 nautical mile to about 6 nautical miles, about 1 nautical mile to about 8 nautical miles, about 1 nautical mile to about 10 nautical miles, about 2 nautical miles to about 3 nautical miles, about 2 nautical miles to about 4 nautical miles, about 2 nautical miles to about 5 nautical miles, about 2 nautical miles to about 6 nautical miles, about 2 nautical miles to about 8 nautical miles, about 2 nautical miles to about 10 nautical miles, about 3 nautical miles to about 4 nautical miles, about 3 nautical miles to about 5 nautical miles, about 3 nautical miles to about 6 nautical miles, about 3 nautical miles to about 8 nautical miles, about 3 nautical miles to about 10 nautical miles, about 4 nautical miles to about 5 nautical miles, about 4 nautical miles to about 6 nautical miles, about 4 nautical miles to about 8 nautical miles, about 4 nautical miles to about 10 nautical miles, about 5 nautical miles to about 6 nautical miles, about 5 nautical miles to about 8 nautical miles, about 5 nautical miles to about 10 nautical miles, about 6 nautical miles to about 8 nautical miles, about 6 nautical miles to about 10 nautical miles, or about 8 nautical miles to about 10 nautical miles.

Some embodiments comprise a step of the sensor positioning system remeasuring its current position after a period of time. In some embodiments, the period of time is about 1 minute to about 24 hours. In various embodiments, the period of time is about 1 minute, 5 minutes, 10 minutes, 30 minutes, 1 hour, 2 hours, 5 hours, 10 hours, 15 hours, 20 hours, or 24 hours, including increments therein. In various further embodiments, the period of time is about 1 minute to about 5 minutes, about 1 minute to about 10 minutes, about 1 minute to about 30 minutes, about 1 minute to about 1 hour, about 1 minute to about 2 hours, about 1 minute to about 5 hours, about 1 minute to about 10 hours, about 1 minute to about 15 hours, about 1 minute to about 20 hours, about 1 minute to about 24 hours, about 5 minutes to about 10 minutes, about 5 minutes to about 30 minutes, about 5 minutes to about 1 hour, about 5 minutes to about 2 hours, about 5 minutes to about 5 hours, about 5 minutes to about 10 hours, about 5 minutes to about 15 hours, about 5 minutes to about 20 hours, about 5 minutes to about 24 hours, about 10 minutes to about 10 minutes, about 10 minutes to about 30 minutes, about 10 minutes to about 1 hour, about 10 minutes to about 2 hours, about 10 minutes to about 5 hours, about 10 minutes to about 10 hours, about 10 minutes to about 15 hours, about 10 minutes to about 20 hours, about 10 minutes to about 24 hours, about 30 minutes to about 30 minutes, about 30 minutes to about 1 hour, about 30 minutes to about 2 hours, about 30 minutes to about 5 hours, about 30 minutes to about 10 hours, about 30 minutes to about 15 hours, about 30 minutes to about 20 hours, about 30 minutes to about 24 hours, about 1 hour to about 1 hour, about 1 hour to about 2 hours, about 1 hour to about 5 hours, about 1 hour to about 10 hours, about 1 hour to about 15 hours, about 1 hour to about 20 hours, about 1 hour to about 24 hours, about 2 hours to about 2 hours, about 2 hours to about 5 hours, about 2 hours to about 10 hours, about 2 hours to about 15 hours, about 2 hours to about 20 hours, about 2 hours to about 24 hours, about 5 hours to about 5 hours, about 5 hours to about 10 hours, about 5 hours to about 15 hours, about 5 hours to about 20 hours, about 5 hours to about 24 hours, about 10 hours to about 10 hours, about 10 hours to about 15 hours, about 10 hours to about 20 hours, about 10 hours to about 24 hours, about 15 hours to about 20 hours, about 15 hours to about 24 hours, or about 20 hours to about 24 hours.

What is claimed is:

1. An unmanned system for towing a sensor array at a depth of at least 50 meters at a speed of at least 0.5 knots for an uninterrupted period of operation of more than 2 days, while operating within an average power consumption budget of less than 20 watts of power comprising:
   a) an underwater assembly comprising a sensor array, a tow body, and a tow cable comprising a float and a weight, wherein the tow cable is attached to the tow body and the sensor array; and
   b) an unmanned watercraft attached to the tow cable, wherein the unmanned watercraft is configured to tow the underwater assembly through water at the depth of at least 50 meters with sufficient force to overcome a drag of the underwater assembly while maintaining the speed of at least 0.5 knots;
   wherein the unmanned watercraft transmits power to, and receives data from, the underwater assembly through the tow cable, and wherein the unmanned watercraft wirelessly receives instructions from, and communicates data to, a control station; and
   wherein the unmanned system operates within the average power consumption budget of less than 20 watts of power for the uninterrupted period of operation of more than 2 days.

2. The unmanned system of claim 1, wherein the control station comprises a computer system comprising:
   a) at least one processor;
   b) a memory;
   c) a cloud computer system; and
   d) an operating system.

3. The unmanned system of claim 1, wherein the unmanned watercraft comprises a ship, a boat, an aerial drone, a hovercraft, a submarine, or any combination thereof.

4. The unmanned system of claim 1, wherein the unmanned watercraft comprises a digital signal processor comprising a microprocessor, a microcontroller, a central processing unit, or any combination thereof.

5. The unmanned system of claim 4, wherein the digital signal processor comprises a system for tampering prevention comprising encryption, cryptography, or any combination thereof.

6. The unmanned system of claim 1, wherein a length of the tow cable is 100 feet to 1,000 feet.

7. The unmanned system of claim 1, wherein the sensor array comprises:
   a) an acoustic sensor; or
   b) a depth sensor comprising a water depth measuring device selected from a group consisting of: a pressure sensor, a bathymeter, an echosounder, an ultrasound meter, and a laser distance meter.

8. The unmanned system of claim 7, wherein a length of the sensor array is 6 feet to 600 feet.

9. The unmanned system of claim 1, wherein the tow body has a mass of 1 pound to 100 pounds.

10. The unmanned system of claim 1, wherein the tow body has a drag coefficient of 0.1 to 2.3.

11. The unmanned system of claim 1, further comprising a tow cable direction sensor mounted to the unmanned watercraft.

12. The unmanned system of claim 1, provided that the unmanned system has an uninterrupted operation period of 3 days to 300 days.

13. The unmanned system of claim 1, provided that the unmanned watercraft uses less than 5 watts of power.

14. The unmanned system of claim 1, wherein the unmanned watercraft wirelessly receives navigational instructions from the control station by a process comprising:
   a) a user programing a target parameter into the control station;
   b) the control station calculating an operational instruction for the unmanned system;

c) the control station sending the operational instruction to the unmanned system;
d) the unmanned system receiving the operational instruction;
e) the unmanned system storing the operational instruction;
f) the unmanned system measuring a current position; and
g) the unmanned system modifying its position.

15. The method of claim 14, wherein the target parameter comprises:
a) a sensor array position;
b) a sensor array velocity;
c) a sensor array heading;
d) initiating sensor array measurement; and
e) ceasing sensor array measurement.

16. The method of claim 14, wherein the operational instructions comprise:
a) an unmanned watercraft position;
b) an unmanned watercraft velocity;
c) an unmanned watercraft heading; and
d) a sensor array depth.

17. The method of claim 14, wherein a series of one or more target parameters can be programmed automatically by selecting a mode, wherein the mode comprises a pattern of target parameters, the modes comprising:
a) a transit mode;
b) an obstacle avoidance mode;
c) a debris disentanglement mode;
d) a trip wire mode; and
e) a searching mode.

18. The method of claim 17, wherein the transit mode comprises:
a) setting a sensor array velocity to a maximum value;
b) ceasing sensor array measurement; or
c) any combination thereof.

19. The method of claim 17, wherein the obstacle avoidance mode comprises:
a) setting a sensor array velocity to a minimum value;
b) setting a sensor array velocity to a maximum value;
c) ceasing sensor array measurement; or
d) any combination thereof.

20. The method of claim 17, wherein the debris disentanglement mode comprises:
a) setting a sensor array velocity to a minimum value;
b) setting a sensor array velocity to a maximum value;
c) setting a sensor array heading to one or more set values;
d) ceasing sensor array measurement; or
e) any combination thereof.

21. The method of claim 17, wherein the trip wire mode comprises:
a) setting a sensor array position to a set value;
b) setting a sensor array velocity to a set value;
c) setting a sensor array heading to a set value;
d) initiating sensor array measurement; or
e) any combination thereof.

22. The method of claim 17, wherein the searching mode comprises:
a) setting a sensor array position to a set value;
b) setting a sensor array velocity to a set value;
c) setting a sensor array heading to a set value;
d) initiating sensor array measurement; or
e) any combination thereof.

23. The method of claim 14, wherein the process of the unmanned system measuring the current position comprises:
a) measuring a location of the unmanned watercraft;
b) measuring a heading of the unmanned watercraft;
c) measuring a sensor array depth; or
d) any combination thereof.

24. The method of claim 23, further comprising the unmanned system communicating the current position to the control station.

25. The method of claim 14, wherein the process of the unmanned system modifying its position comprises:
a) modifying a position of the unmanned watercraft;
b) modifying a velocity of the unmanned watercraft;
c) modifying a heading of the unmanned watercraft; or
d) any combination thereof.

26. The method of claim 14, further comprising the unmanned system remeasuring its current position after a period of time.

* * * * *

UNITED STATES PATENT AND TRADEMARK OFFICE
CERTIFICATE OF CORRECTION

PATENT NO. : 9,778,388 B1  
APPLICATION NO. : 15/388212  
DATED : October 3, 2017  
INVENTOR(S) : Michael Joseph Connor Page 1 of 1

It is certified that error appears in the above-identified patent and that said Letters Patent is hereby corrected as shown below:

In the Claims

Claim 14, Column 20, Line 64, please delete "programing" and replace with --programming--.

Signed and Sealed this
Twenty-second Day of May, 2018

Andrei Iancu
*Director of the United States Patent and Trademark Office*